(12) United States Patent
Kono

(10) Patent No.: US 11,041,417 B2
(45) Date of Patent: Jun. 22, 2021

(54) INTERNAL COMBUSTION ENGINE

(71) Applicant: HONDA MOTOR CO., LTD., Tokyo (JP)

(72) Inventor: Shohei Kono, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/758,293

(22) PCT Filed: Dec. 11, 2017

(86) PCT No.: PCT/JP2017/044430
§ 371 (c)(1),
(2) Date: Apr. 22, 2020

(87) PCT Pub. No.: WO2019/116430
PCT Pub. Date: Jun. 20, 2019

(65) Prior Publication Data
US 2020/0318507 A1   Oct. 8, 2020

(51) Int. Cl.
*F01M 13/00* (2006.01)
*F02F 7/00* (2006.01)
*F02M 35/10* (2006.01)

(52) U.S. Cl.
CPC .......... *F01M 13/00* (2013.01); *F02F 7/0002* (2013.01); *F02F 7/0053* (2013.01); *F02M 35/10222* (2013.01)

(58) Field of Classification Search
CPC ................. F01M 13/00; F01M 13/002; F01M 2013/0433; F01M 13/04; F02F 7/0002;
(Continued)

(56) References Cited

U.S. PATENT DOCUMENTS 5,901,679 A * 5/1999 Tanaka .................. F02F 7/0053
123/195 C
2002/0020400 A1   2/2002 Sato et al.
(Continued)

FOREIGN PATENT DOCUMENTS

EP   1147298 A1   10/2001
JP   S5036927 U   4/1975
(Continued)

OTHER PUBLICATIONS

English translation of International Search Report for International Application No. PCT/JP2017/044430, dated Feb. 13, 2018, 2 pages.
(Continued)

*Primary Examiner* — Joseph J Dallo
*Assistant Examiner* — Yi-Kai Wang
(74) *Attorney, Agent, or Firm* — Armstrong Teasdale LLP

(57) ABSTRACT

In an internal combustion engine, a breather chamber can be formed without increasing the number of component parts. The internal combustion engine (1) comprises an engine block (30) defining a cylinder (2); a case member (19) fastened to a lower part of the engine block to define a crank chamber (4) jointly with the engine block; and a bearing member (50) fastened to the engine block in the crank chamber to rotatably support a crankshaft; wherein the engine block is provided with a central recess (134) formed in a part thereof to which the bearing member is fastened, a blow-by gas inlet passage (112, 116, 121) communicating the central recess with the crank chamber, and a blow-by gas return passage (122, 118) forming a part of a passage communicating the central recess with an intake device, the central recess and the bearing member jointly defining a central breather chamber.

8 Claims, 8 Drawing Sheets

(58) Field of Classification Search
CPC ........ F02F 7/0053; F02F 1/002; F02F 7/0065; F02M 35/10222; F02M 25/06
USPC ........................................................ 123/572
See application file for complete search history.

(56) References Cited

U.S. PATENT DOCUMENTS

2009/0064642 A1    3/2009  Sato et al.
2011/0232477 A1*   9/2011  Taki .................. F01M 13/0011
                                                      92/82

FOREIGN PATENT DOCUMENTS

| JP | S5453141 U    | 4/1979 |
| JP | H0648092 Y2 * | 1/1989 |
| JP | H02103109 U   | 8/1990 |
| JP | H0874551 A    | 3/1996 |
| JP | H10148156 A   | 6/1998 |
| JP | 2003254032 A  | 9/2003 |
| JP | 3819685 B2    | 9/2006 |
| WO | 0043655 A1    | 7/2000 |

OTHER PUBLICATIONS

EPO Extended Search Report for EP Application No. 17935034.3 dated Oct. 30, 2020; 8 pp.

* cited by examiner

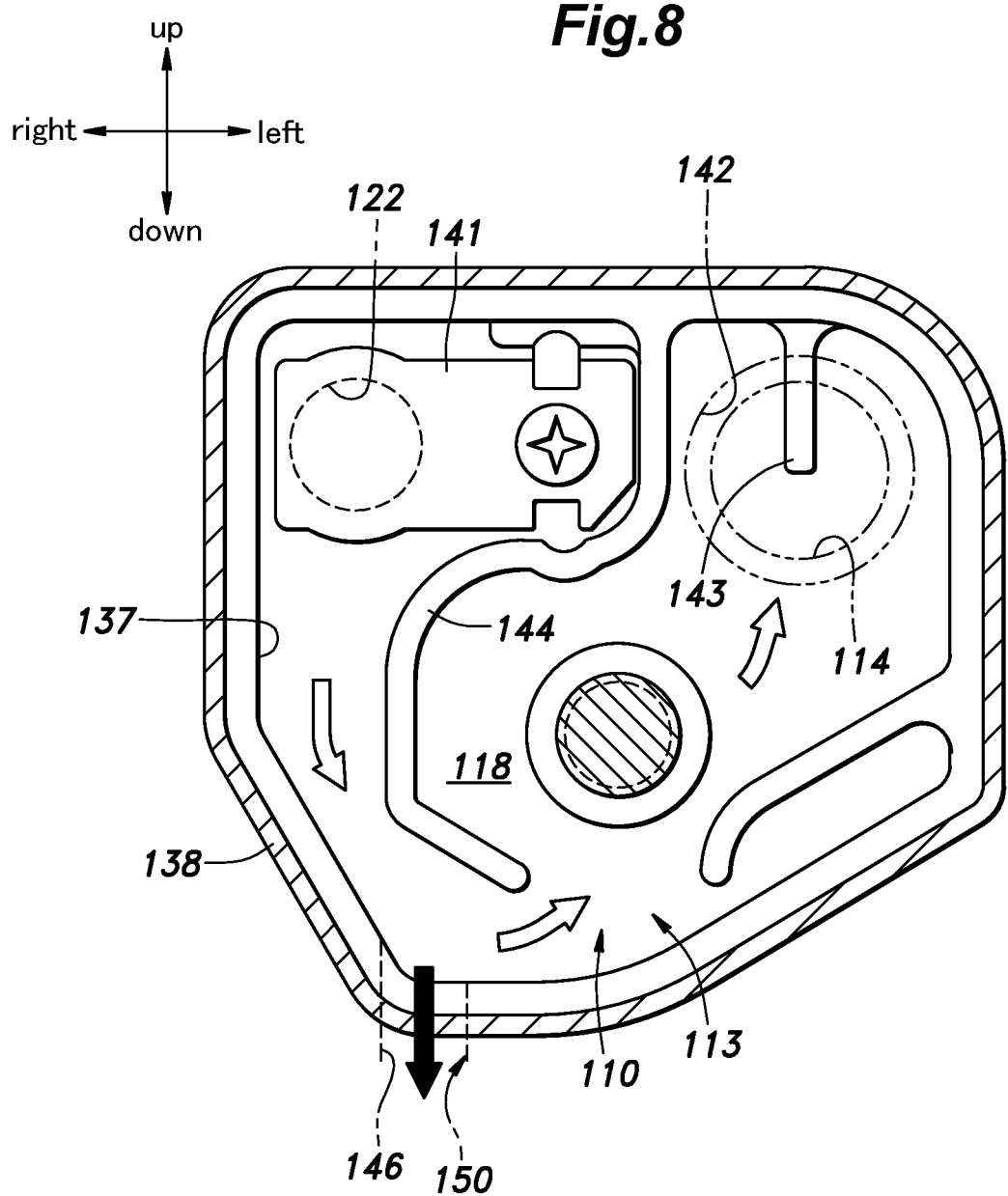

INTERNAL COMBUSTION ENGINE

CROSS-REFERENCE TO RELATED APPLICATIONS

This application is a U.S. National Phase Application of PCT/JP2017/044430, filed Dec. 11, 2017, the contents of which are hereby expressly incorporated by reference in their entirety.

TECHNICAL FIELD

The present invention relates to an internal combustion engine provided with a breather chamber.

BACKGROUND ART

An internal combustion engine provided with a breather chamber for separating oil from blow-by gas in a cylinder block is known (for example, Patent Document 1). In the internal combustion engine disclosed in Patent Document 1, a first recess is formed on one side of a cylinder block, and a first breather chamber is formed by closing the first recess with a first cover. Further, a second recess is formed on another side of the cylinder block, and a second breather chamber is formed by closing the second recess with a second cover. The first breather chamber is communicated with the second breather chamber via a communicating passage extending laterally along a side of the cylinder. The breather gas flows through the first breather chamber, the communication passage and the second breather chamber, in that order, before flowing into an intake device.

PRIOR ART DOCUMENT(S)

Patent Document(s)

Patent Document 1: JP3819685B2

SUMMARY OF THE INVENTION

Task to be Accomplished by the Invention

The internal combustion engine mentioned above has a problem that the number of component parts increases because additional covers are required to form the breather chambers.

In view of such a back ground, an object of the present invention is to form a breather chamber without increasing the number of component parts.

Means to Accomplish the Task

To achieve such an object, the present invention provides an internal combustion engine (1), comprising: an engine block (30) defining a cylinder (2); a case member (19) fastened to a lower part of the engine block to define a crank chamber (4) jointly with the engine block; and a bearing member (50) fastened to the engine block in the crank chamber to rotatably support a crankshaft; wherein the engine block is provided with a central recess (134) formed in a part thereof to which the bearing member is fastened, a blow-by gas inlet passage (112, 116, 121) communicating the central recess with the crank chamber, and a blow-by gas return passage (122, 118) forming a part of a passage communicating the central recess with an intake device, the central recess and the bearing member jointly defining a central breather chamber.

According to this arrangement, the central breather chamber can be formed above the bearing member in the cylinder block. The central breather chamber can be formed by the recess formed in the cylinder block and the bearing member fastened to the cylinder block. Since the recess is exposed to the outside before being closed by the bearing member, the necessary processing such as deburring can be performed during the process of forming the engine block.

In this arrangement, preferably, the bearing member extends orthogonally to an axis of the crankshaft as viewed in a direction extending along an axis of the cylinder, and is provided with a pair of bolt holes (59) through which bolts (62) for fastening the bearing member to the engine block pass in either end part thereof, and the engine block is provided with a pair of female screw holes (61) into which the respective bolts are threaded in parts thereof opposing the respective bolt holes, the central recess being positioned between the female screw holes.

Thus, the central breather chamber can be formed by making use of the part of the cylinder block located between the female screw holes.

In this arrangement, preferably, the central recess extends along the bearing member.

Thereby, the central breather chamber can be conveniently positioned between the female screw holes.

In this arrangement, preferably, the central recess is formed deeper than the female screw holes, and at least one of the blow-by gas inlet passage and the blow-by gas return passage extends above one of the female screw holes.

Thereby, the blow-by gas inlet passage and the blow-by gas return passage can be arranged around the cylinder in a compact fashion while avoiding the female screw holes.

In this arrangement, preferably, at least one baffle wall (135) projects into the central recess.

Thereby, oil can be separated from the blow-by gas in the first breather chamber.

In this arrangement, preferably, at least one of the engine block and the bearing member is provided with an oil return passage communicating the central breather chamber with the crank chamber.

Thereby, the oil collected in the central breather chamber can be returned to the crank chamber.

In this arrangement, preferably, as viewed in a direction extending along an axis of the crankshaft, the blow-by gas inlet passage is located on one side of the cylinder, and the blow-by gas return passage is located on another side of the cylinder, the blow-by gas inlet passage includes an upstream breather chamber (116), and a first connection passage (121) extending linearly from the upstream breather chamber to the central breather chamber, and the blow-by gas return passage includes a downstream breather chamber (118), and a second connection passage (122) extending linearly from the downstream breather chamber to the central breather chamber.

Since the upstream breather chamber and the downstream breather chamber are provided in addition to the central breather chamber, the oil can be separated from the blow-by gas in a more reliable manner.

In this arrangement, preferably, the upstream breather chamber is formed by a first recess (131) formed on one side surface of the engine block and a first cover (132) closing the first recess, and the upstream breather chamber is formed by a second recess (132) formed on another side surface of the engine block and a second cover (138) closing the second recess, and wherein an end of the first connection passage opens at a bottom portion of the first recess, and an end of the second connection passage opens at a bottom portion of the second recess.

Thereby, when forming the cylinder block, the first connection passage and the second connection passage can be formed by a mold. Since the first recess is formed between the first connection passage and the second connection passage, the stroke or the travel of the mold that is required to form the first connection passage and the second connection passage can be minimized so that the size of the molding device or the casting device can be reduced.

In this arrangement, preferably, a transmission mechanism case accommodating a transmission mechanism therein is provided on a side part of the cylinder block, and the central recess is formed in a part forming both a part of both the cylinder block and a part of the transmission mechanism case.

Thereby, the central breather chamber can be formed in a boundary part between the cylinder block and the transmission mechanism case.

Effect of the Invention

According to the above configuration, it is possible to form a breather chamber without increasing the number of component parts.

BRIEF DESCRIPTION OF THE DRAWINGS

FIG. 8 is a side view of a front recessed part of the engine block as viewed from front.

DESCRIPTION OF THE PREFERRED EMBODIMENT(S)

Figure 1:
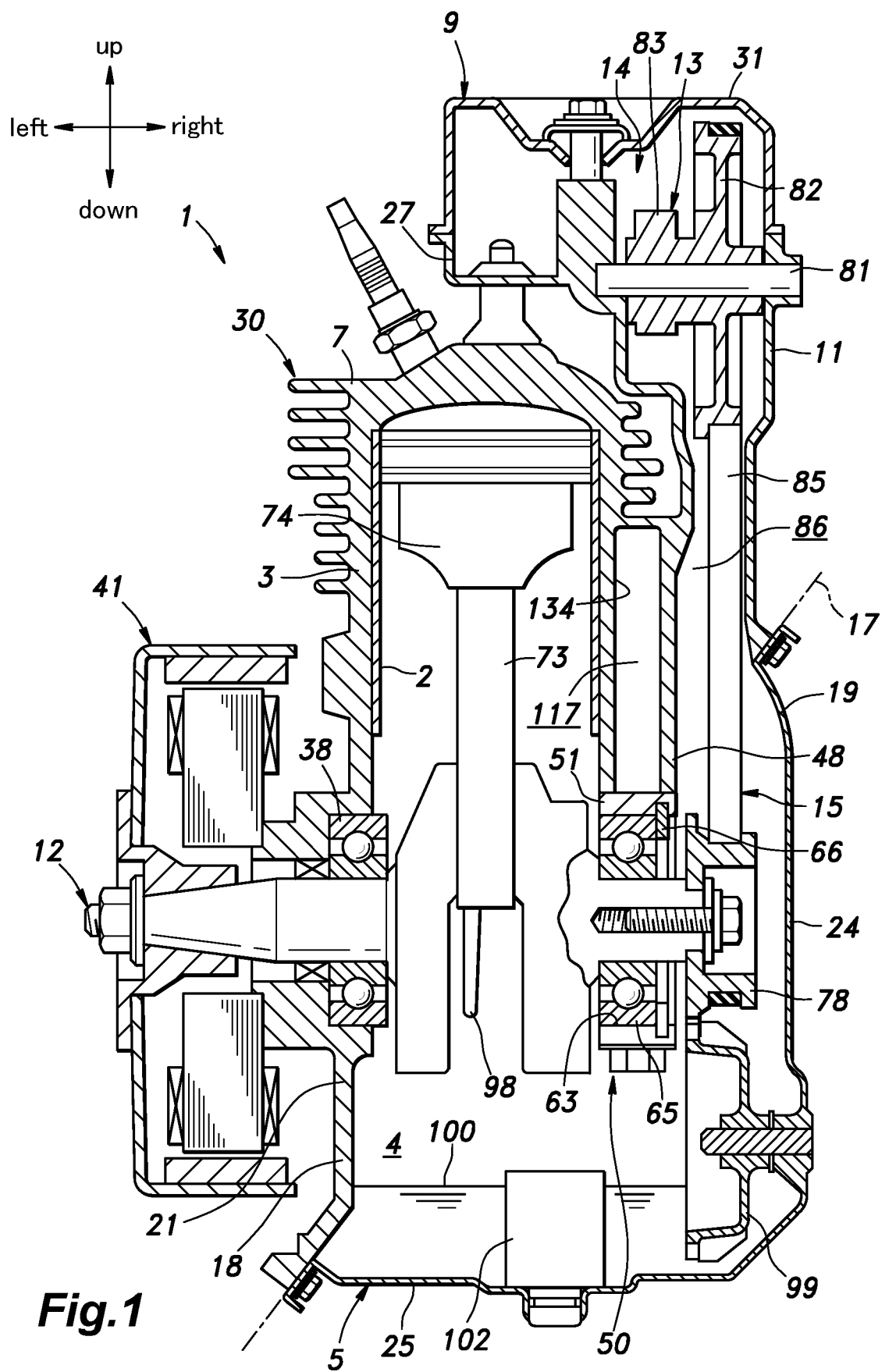
FIG. 1 is a section view of an internal combustion according to the present embodiment as viewed from behind.

An internal combustion engine according to a preferred embodiment of the present invention is described in the following with reference to the appended drawings.
(Overall Structure of Internal Combustion Engine)

As shown in FIGS. 1 to 4, the internal combustion engine 1 consists of a single cylinder, overhead camshaft (OHC), four-stroke reciprocating engine. The internal combustion engine 1 is provided with a cylinder block 3 defining a cylinder 2, a crankcase 5 provided under the cylinder block 3 to define a crank chamber 4, a cylinder head 7 provided above the cylinder block 3 to close an upper end of the cylinder 2, a valve actuating chamber case 9 provided above the cylinder head 7 to define a valve actuating chamber, and a belt case 11 (a transmission mechanism case) connecting the crankcase 5 and the valve actuating chamber case 9 with each other. The crank chamber 4 receives a crankshaft 12 therein, the valve actuating chamber receives a valve actuating mechanism 14 including a camshaft 13 therein, and the belt case 11 receives a power transmission mechanism 15 that transmits the rotational force of the crankshaft 12 to the camshaft 13 therein.

The crankcase 5 consists of a first case half 18 and a second case half 19 (case member) which are divided from each other by a parting surface 17 that is inclined with respect to the axis of the crankshaft 12 that extends in the lateral direction. The parting surface 17 is inclined upward (to the right) toward the belt case 11. The first case half 18 forms a left end wall 21 of the crankcase 5 and upper portions of a front side wall 22 and a rear side wall 23. The second case half 19 forms a right end wall 24 of the crankcase 5, lower portions of the front side wall 22 and the rear side wall 23, and a bottom wall 25. The first case half 18, the cylinder block 3, the cylinder head 7, the belt case 11, and the valve actuating chamber case lower part 27 forming a lower part of the valve actuating chamber case 9 are formed as an engine block 30 formed integrally by metal casting. The second case half 19 may be, for example, a stamp formed product of a metal plate or a molded plastic product. The second case half 19 is fastened to the first case half 18 by bolts. A valve actuating chamber case upper part 31, which is an upper part of the valve actuating chamber case 9, is, for example, a stamp formed product or a molded plastic product, and is fastened to a valve actuating chamber case lower part 27, which is a lower part of the valve actuating chamber case 9, by bolts or the like.

The cylinder 2 extends vertically inside the cylinder block 3. The cylinder head 7 is formed integrally with the cylinder block 3 and closes the upper end of the cylinder 2. The cylinder head 7 has an intake port 33 and an exhaust port 34 opening at the upper end of the cylinder 2. The intake port 33 is provided with an intake valve, and the exhaust port 34 is provided with an exhaust valve. The cylinder head 7 is provided with a spark plug.

The left end wall 21 of the crankcase 5 is provided with a first bearing 38 that rotatably supports a left journal of the crankshaft 12. The first bearing 38 may be a ball bearing or a plain bearing. The left end of the crankshaft 12 projects leftward from the left end wall 21 of the crankcase 5, and is connected to a generator 41. The generator 41 has a stator including a coil mounted on the outer surface of the left end wall 21, and a rotor including a permanent magnet coupled to the left end of the crankshaft 12.

A support wall 48 protruding downward is provided on a part of the lower surface of the cylinder block 3 located to the right of the cylinder 2. The support wall 48 is arranged on the left side of the lower end of the belt case 11. The support wall 48 forms a part of the wall of the cylinder block 3 and also forms a part of the wall of the belt case 11. Further, the support wall 48 is disposed at a boundary between the cylinder block 3 and the belt case 11.

A bearing member 50 that rotatably supports the right end of the crankshaft 12 is attached to the lower end of the support wall 48. The bearing member 50 has a support body 51 fastened to the support wall 48. The lower end of the support wall 48 is formed with a flat block-side fastening surface 52, and the upper end of the support body 51 is formed with a bearing-side fastening surface 53 which is in contact with the block-side fastening surface 52. The support wall 48 and the support body 51 extend in a direction (fore and aft direction) perpendicular to the crankshaft 12 when viewed from a direction extending along the axis of the cylinder 2 (vertical direction), and are each formed in a plate shape having a major plane facing in the lateral direction.

Figure 3:
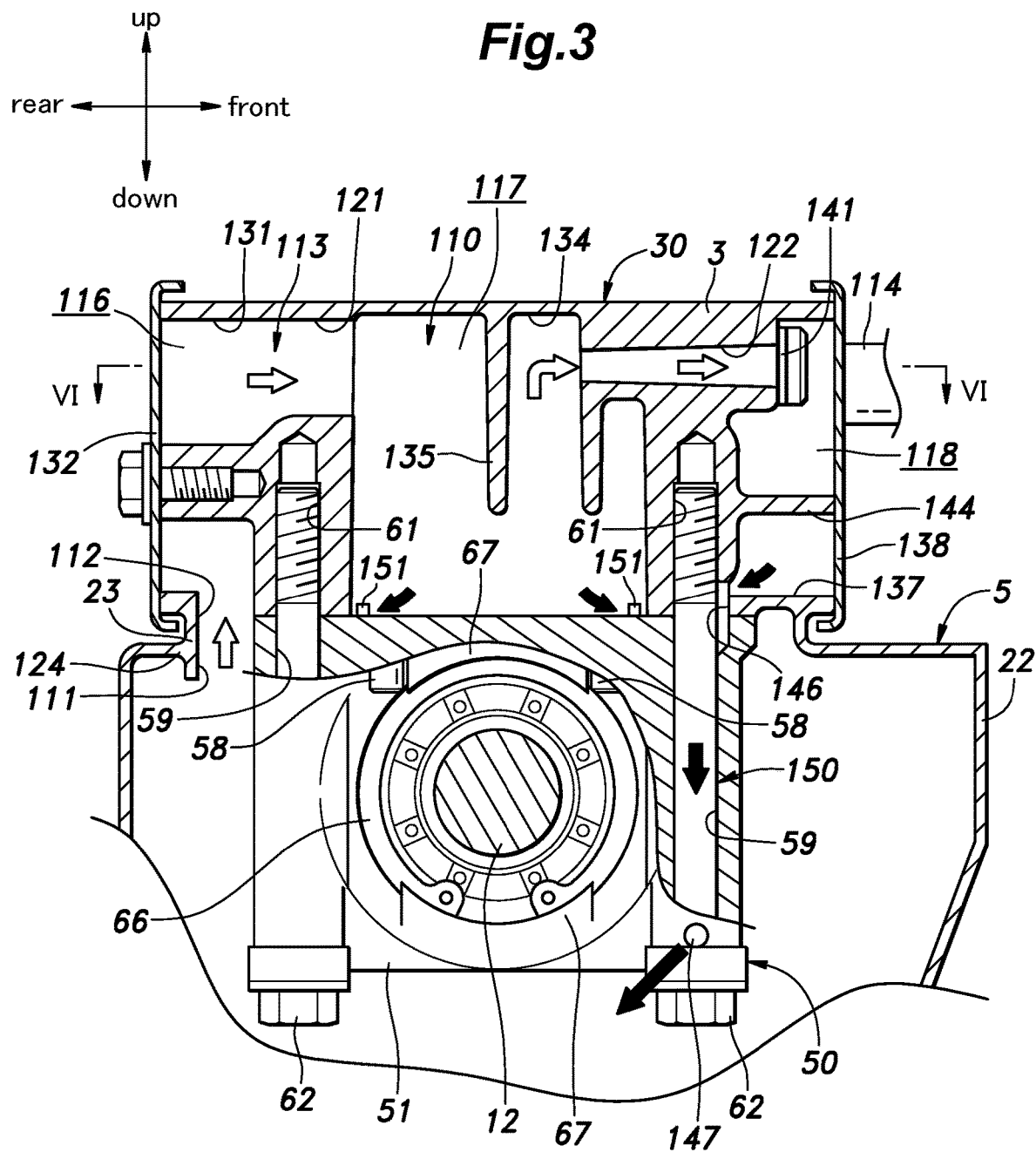
FIG. 3 is an enlarged sectional view of an engine block as viewed from right showing a blow-by gas passage.
Figure 4:
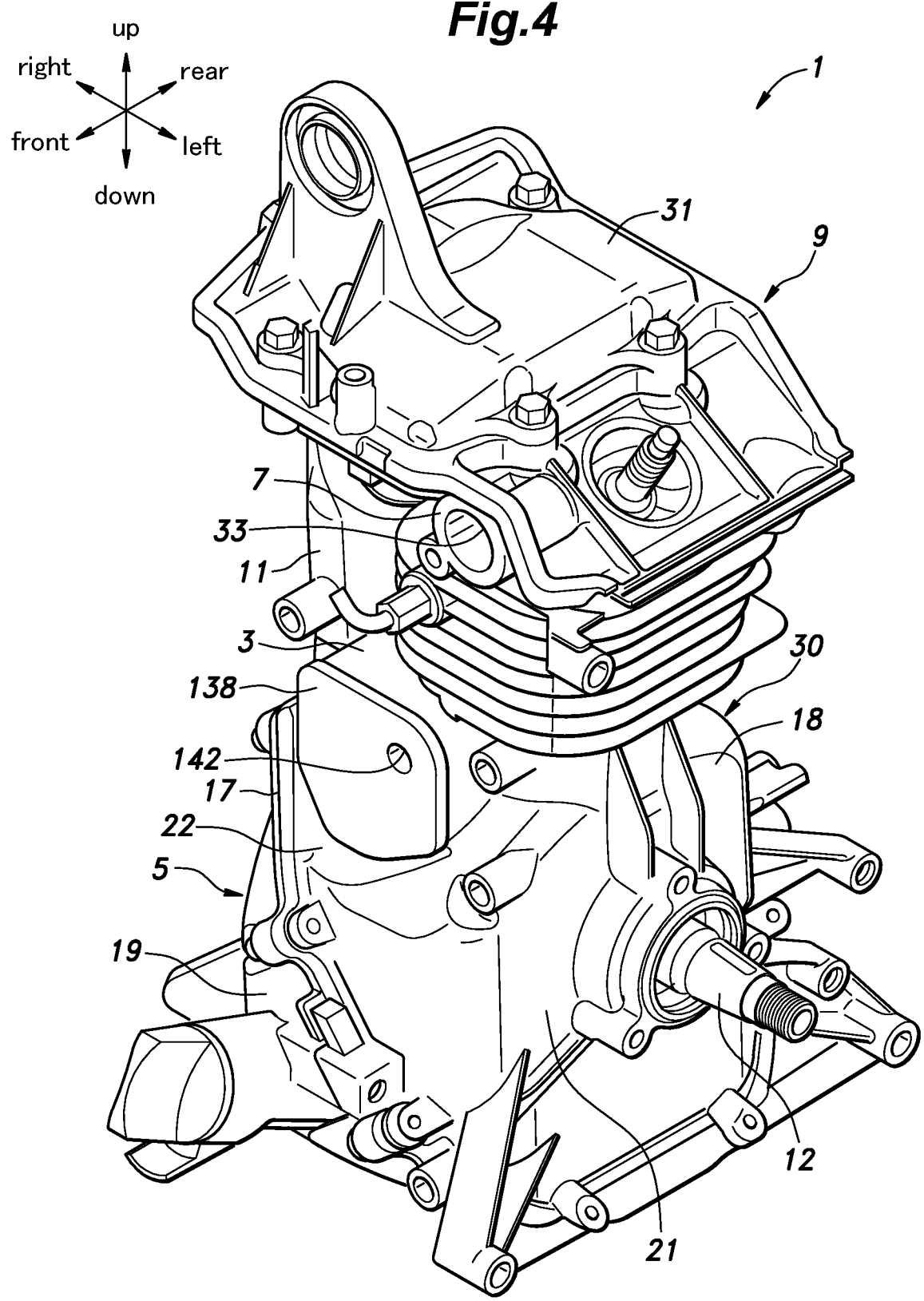
FIG. 4 is a perspective of the internal combustion engine of the present embodiment.
Figure 5:
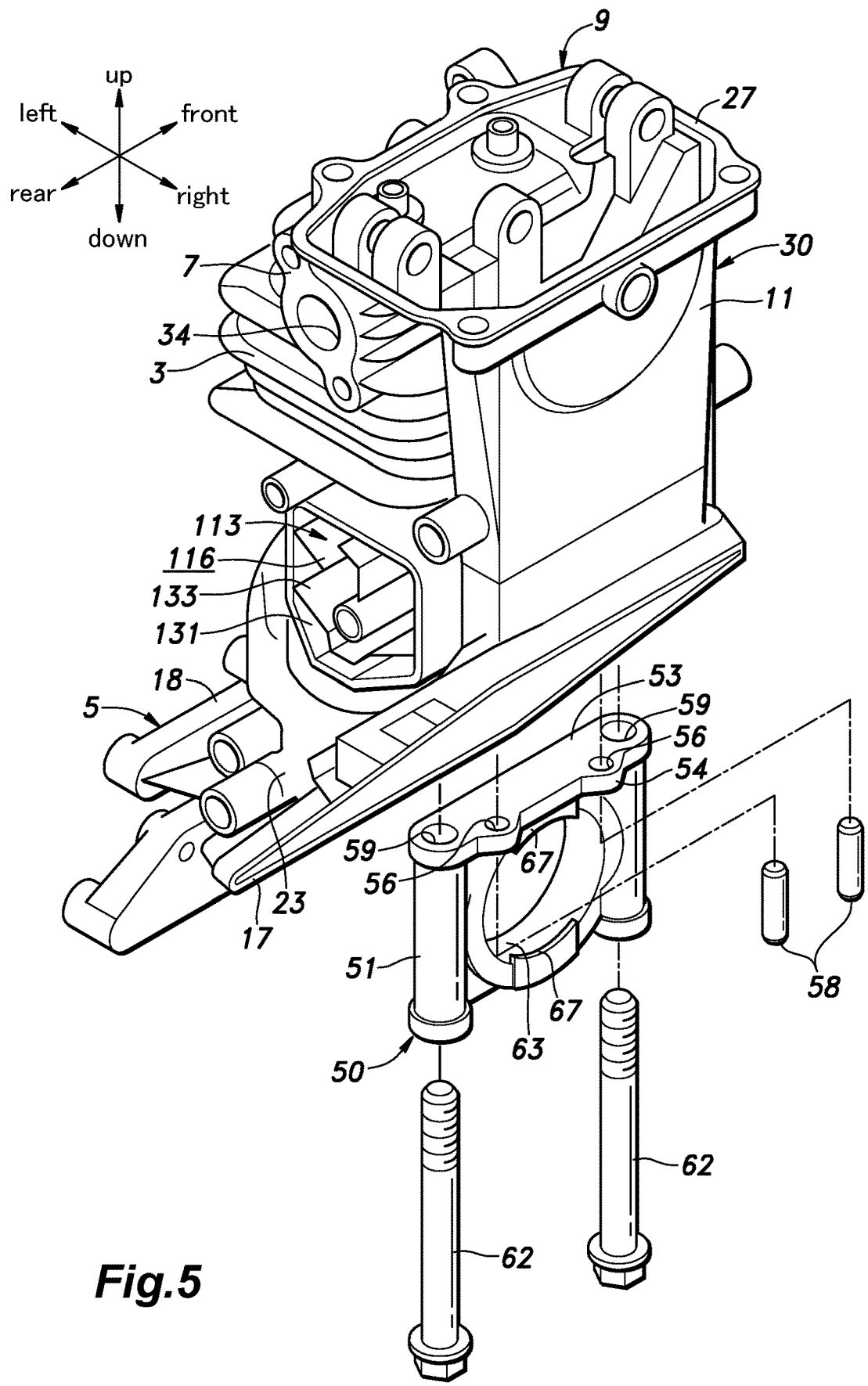
FIG. 5 is an exploded perspective of the internal combustion engine of the present embodiment.
Figure 6:
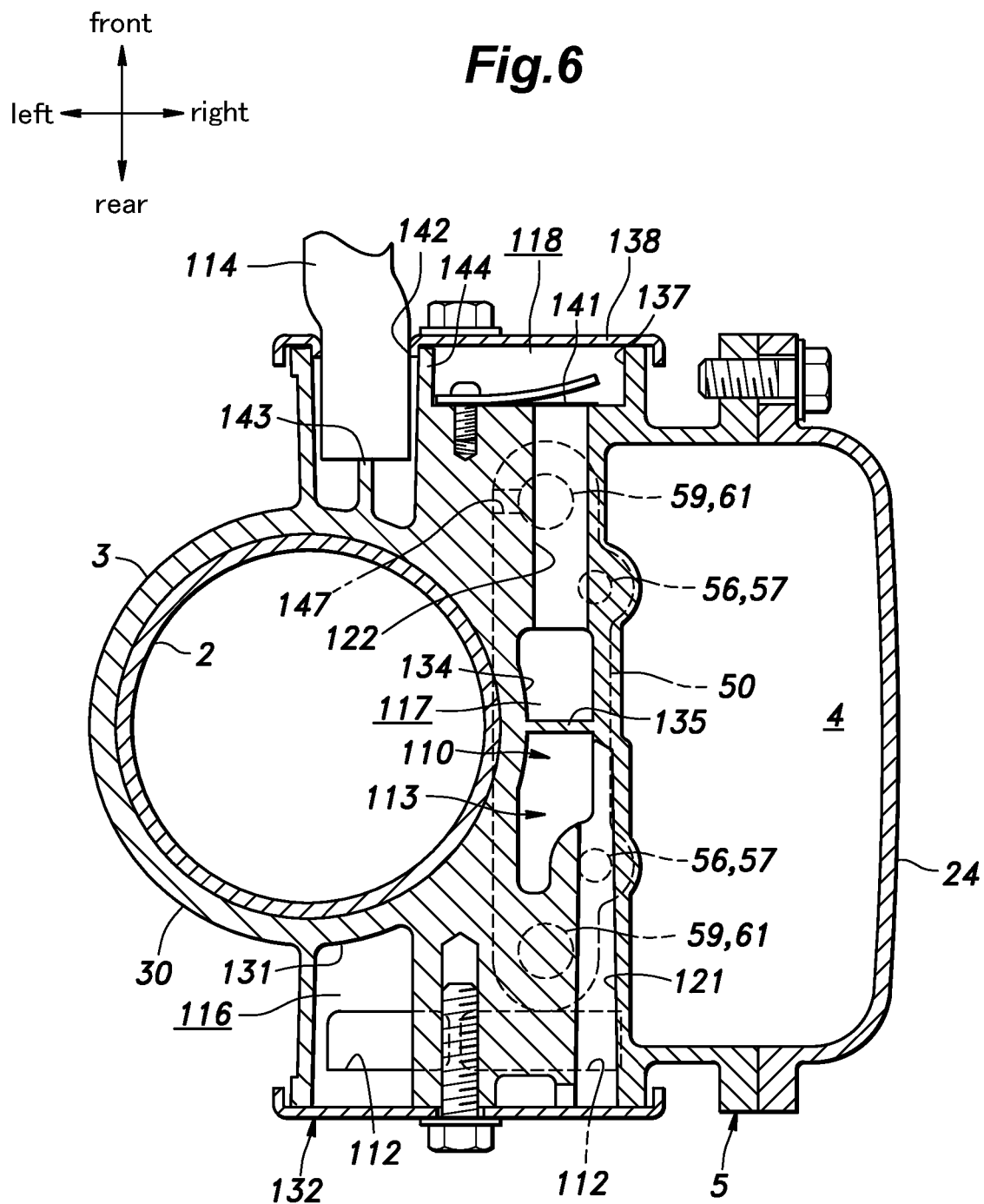
FIG. 6 is a sectional view taken along line VI-VI of FIG. 3.
Figure 7:
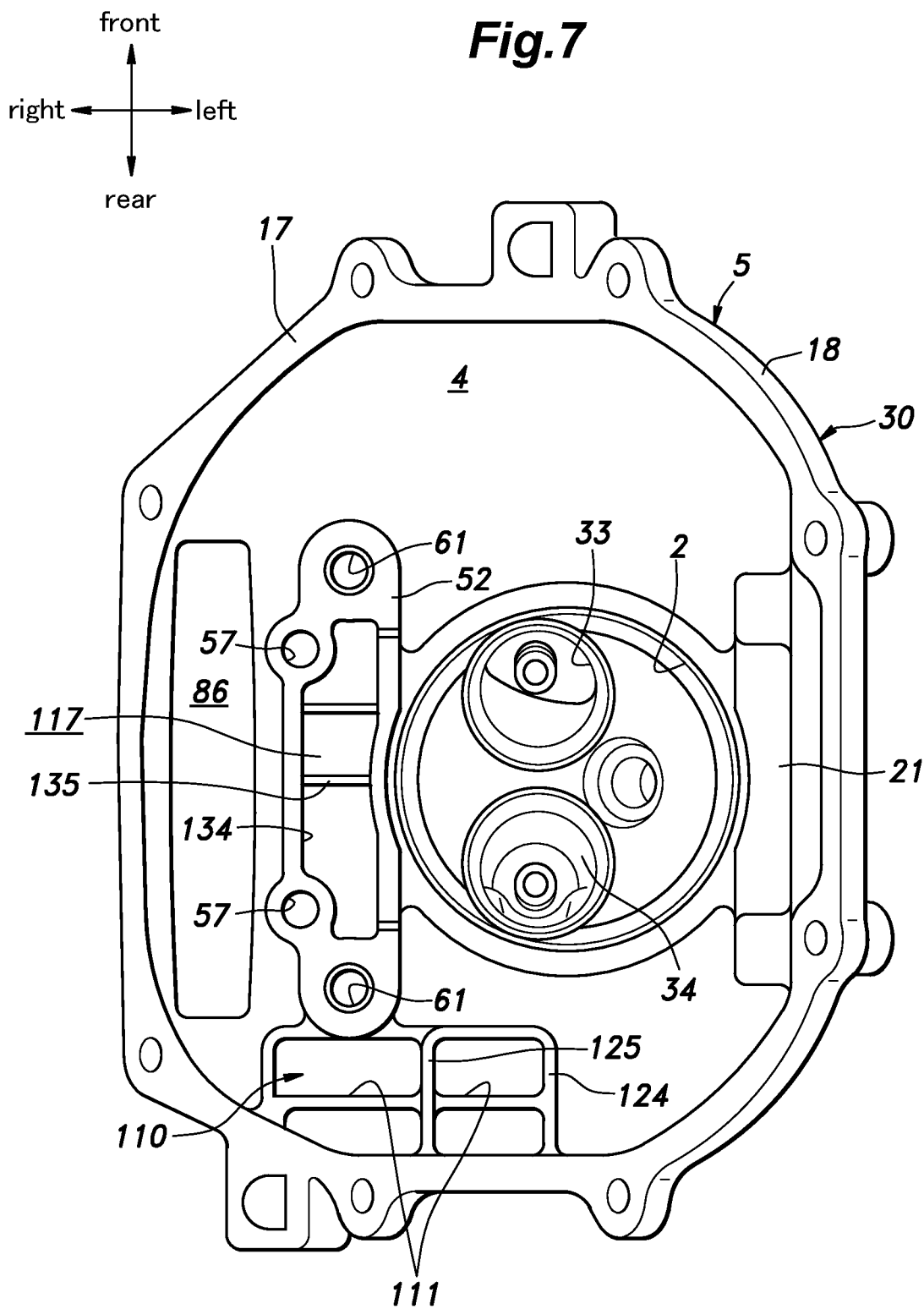
FIG. 7 is a bottom view of the engine block.

As shown in FIG. 5, a flange 54 protrudes laterally from the right edge of the upper end of the support body 51. A pair of first pin holes 56 are passed vertically through the flange 54. As shown in FIGS. 6 and 7, a pair of second pin holes 57 are passed into a part of the block-side fastening surface 52 facing the two first pin holes 56. The position of the support body 51 with respect to the cylinder block 3 is determined by inserting positioning pins 58 into the first pin holes 56 and the second pin holes 57 in a corresponding manner. As shown in FIG. 3, when the positioning pins 58 are inserted into the first pin hole 56 and the second pin hole 57 in a corresponding manner, the lower ends of the positioning pins 58 protrude downward from the corresponding first pin holes 56.

As shown in FIGS. 3 and 5, a bolt hole 59 is passed vertically through each of a front end part and a rear end part of the support body 51. A pair of female screw holes 61 are formed in the block-side fastening surface 52 at parts thereof facing the respective bolt holes 59. The support body 51 of the bearing member 50 is fastened to the cylinder block 3 by a pair of bolts 62 that are inserted through the respective bolt holes 59 and threaded into the respective female screw holes 61.

A bearing hole 63 extends laterally through the support body 51. A second bearing 65 is fitted in the bearing hole 63. The second bearing 65 consists of a ball bearing in the present embodiment, but may be either a ball bearing or a plain bearing. The right end edge part of the bearing hole 63 is formed with a plurality of engagement pieces 67 for engaging a retaining ring 66. The engagement pieces 67 engage the outer peripheral portion of the retaining ring 66 so as to keep the inner peripheral portion of the retaining ring 66 protruding into the bearing hole 63. As shown in FIG. 1, the second bearing 65 is held in the bearing hole 63 by abutting against a shoulder surface formed on the crankshaft 12 and the retaining ring 66. As shown in FIG. 3, the upper peripheral parts of the retaining ring 66 are in contact with the lower ends of the positioning pins 58 so as to prevent the positioning pins 58 from coming out of the first pin holes 56 and the second pin holes 57.

As shown in FIG. 1, the crankshaft 12 is provided with a pair of crank webs located between the first bearing 38 and the second bearing 65 and a crankpin extending between the crank webs. The crankpin is connected to a piston 74 slidably received in the cylinder 2 via a connecting rod 73. The right end of the crankshaft 12 protrudes to the right of the second bearing 65 and is spaced from the inner surface of the right end wall 24 of the crankcase 5 by a certain distance.

A support shaft 81 extends in parallel with the crankshaft 12 in a lower part of the valve actuating chamber case 9. A cylindrical camshaft 13 is rotatably supported on the support shaft 81, and a cam pulley 82 is coaxially attached to an end of the camshaft 13. The cam pulley 82 rotates integrally with the camshaft 13 relative to the support shaft 81. A cam 83 protrudes from the outer peripheral surface of the camshaft 13 in a radial direction. The camshaft 13 and the cam pulley 82 are arranged in the valve actuating chamber.

The crank pulley 78 and the cam pulley 82 are each provided with teeth on the outer periphery thereof. A toothed belt 85 formed as an endless transmission belt is passed around the crank pulley 78 and the cam pulley 82. The toothed belt 85 extends from the crank chamber 4 in which the crank pulley 78 is disposed, passes through a belt chamber 86 (transmission mechanism chamber) defined in the belt case 11, and extends into a valve actuating chamber in which the cam pulley 82 is disposed. The belt case 11 extends vertically on one side of the cylinder block 3, and the belt chamber 86 communicates with an upper part of the crank chamber 4 at a lower end thereof and with a lower part of the valve actuating chamber at an upper end thereof. The crank pulley 78, the cam pulley 82, and the toothed belt 85 constitute the power transmission mechanism 15 that transmits the rotation of the crankshaft 12 to the camshaft 13.

The valve actuating mechanism 14 opens and closes the intake valve and the exhaust valve at a predetermined timing according to the rotation of the crankshaft 12. The valve actuating mechanism 14 includes, in addition to the camshaft 13, an intake rocker arm and an exhaust rocker arm rotatably supported by a rocker shaft provided in the valve actuating chamber case lower part 27, and actuated by the cam 83 so as to selectively push the intake valve and the exhaust valve in the opening direction, and a pair of valve springs urging the intake valve and the exhaust valve, respectively, in the closing direction.

Figure 2:
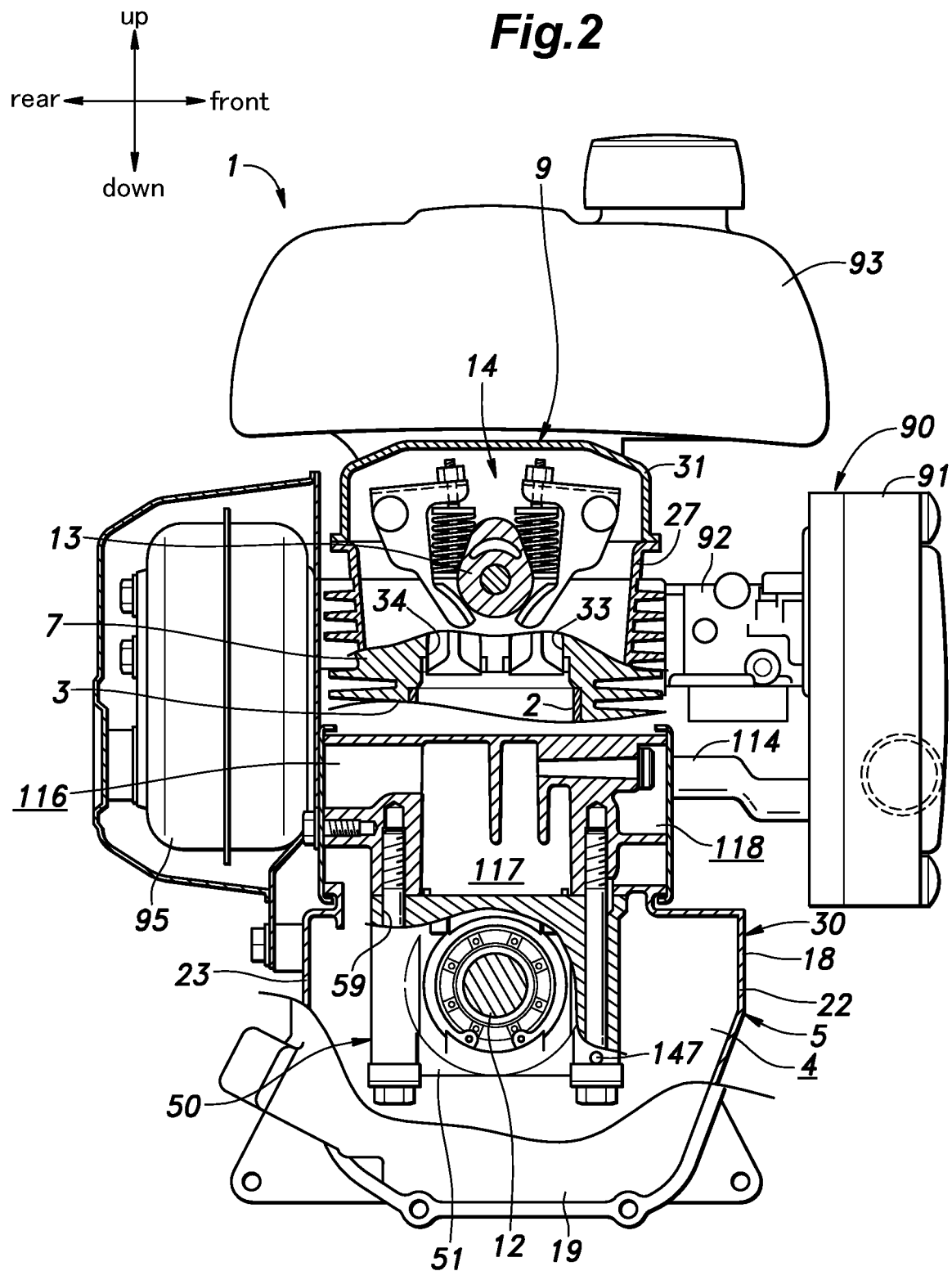
FIG. 2 is a section view of an internal combustion according to the present embodiment as viewed from right.

As shown in FIG. 2, an intake device 90 is connected to the intake port 33. The intake device 90 is arranged on the front side of the cylinder block 3, and is provided with an intake inlet (not shown the drawings), an air cleaner 91, and a carburetor 92, in that order from the upstream end. The carburetor 92 is supplied with fuel from a fuel tank 93 provided above the valve chamber 9. An exhaust muffler 95 is connected to the exhaust port 34. The exhaust muffler 95 is covered by a muffler cover supported by the cylinder block 3.

As shown in FIG. 1, oil (lubricating oil) is stored in a lower part of the crank chamber 4. The big end of the connecting rod 73 is provided with an oil dipper 98 (oil scraper) that projects in the radial direction of the crankshaft 12. A stirring wheel 99 is rotatably supported in a lower part of the right end wall 24 formed by the second case half 19. The stirring wheel 99 has a disk portion, a plurality of blades protruding from the outer peripheral surface of the disk portion, and a gear formed on the outer peripheral surface of the disk portion. The gear of the stirring wheel 99 meshes with a gear formed on the outer peripheral surface of the crank pulley 78 so that the stirring wheel 99 rotates jointly with the crank pulley 78. When the internal combustion engine 1 is operated, the oil surface 100 of the oil in the crank chamber 4 is arranged so as to be above the lower end of the stirring wheel 99 so that the oil is splashed by the stirring wheel 99. An oil level sensor 102 is provided on the bottom wall 25 of the crankcase 5.

(Blow-by Gas Passage)

As shown in FIG. 3, the internal combustion engine 1 is provided with a blow-by gas passage 110 for returning the blow-by gas in the crank chamber 4 to the intake device 90. The blow-by gas passage 110 includes a gas inlet 111, an inlet passage 112, a breather chamber 113, and a connection pipe 114, in series in that order from the upstream end. The blow-by gas passage 110 opens to the crank chamber 4 at the gas inlet 111 and is communicated with the air cleaner 91 via the connection pipe 114. The breather chamber 113 is partitioned into an upstream breather chamber 116, a central breather chamber 117, and a downstream breather chamber 118, in that order from the upstream end. The upstream breather chamber 116 and the central breather chamber 117 are communicated with each other via a first connection passage 121, and the central breather chamber 117 is communicated with the downstream breather chamber 118 via a second connection passage 122.

As shown in FIGS. 3 and 7, an upper part of the rear side wall 23 of the crankcase 5 formed by the first case half 18 has a bulging portion 124 protruding forward. The gas inlet 111 is formed on the lower surface of the bulging portion 124 and opens downward. The inlet passage 112 extends upward from the gas inlet 111 inside the bulging portion 124. In the present embodiment, the gas inlet 111 and the inlet passage 112 are each partitioned into a pair of parallel passage parts by a partition wall 125.

As shown in FIGS. 3, 5, and 6, a rear recess 131 which is recessed toward the cylinder 2 is formed on the rear side surface of the cylinder block 3. The upper end of the inlet passage 112 opens at a lower part of the rear recess 131. The rear recess 131 is closed by a rear cover 132 fastened to the cylinder block 3 so as to define the upstream breather chamber 116 jointly with the rear cover 132. One end of the first connection passage 121 opens at an upper part of the bottom surface of the rear recess 131. A plurality of baffle walls 133 project from the bottom surface of the rear recess 131 toward the rear cover 132. The baffle walls 133 meander the flow path extending in the upstream breather chamber 116 from the inlet passage 112 provided in the lower part thereof to the first connection passage 121 provided in the upper part thereof.

As shown in FIGS. 3, 6, and 7, the block-side fastening surface 52 of the support wall 48 on the lower surface of the cylinder block 3 is formed with a central recess 134 which is recessed upward. The central recess 134 is formed in a part forming a part of the cylinder block 3 which also forms a part of the belt case 11. In other words, the central recess 134 is formed in a wall part that separates the cylinder block 3 and the belt case 11 from each other. The central recess 134 extends between the female screw holes 61 in a direction orthogonal to the axis of the crankshaft 12 in a plan view. The central recess 134 is disposed on the left side of the second pin holes 57. The central recess 134 is closed by the support body 51 fastened to the block-side fastening surface 52, and forms the central breather chamber 117 jointly with the support body 51. The central breather chamber 117 is arranged on one side of the cylinder 2 and above the bearing member 50. The central breather chamber 117 extends along the support body 51 of the bearing member 50. The central recess 134 is formed deeper than the female screw holes 61. In other words, the upper end of the central recess 134 is located above the upper ends of the female screw holes 61.

The first connection passage 121 extends in the fore and aft direction above the rear second pin hole 57, and communicates an upper part of the upstream breather chamber 116 with an upper part of the front end of the central breather chamber 117. The first connection passage 121 extends linearly, and has an increased width in a part thereof extending from the central breather chamber 117 to the upstream breather chamber 116. One end of the second connection passage 122 opens at an upper end part of the rear end of the central breather chamber 117. At least one baffle wall 135 protrudes downward from the bottom surface of the central recess 134. The baffle wall 135 has a major plane facing in the fore and aft direction, and the left and right ends of the baffle wall 135 are connected to the left and right wall surfaces of the central recess 134, respectively. The baffle wall 135 causes the flow path extending from the first connection passage 121 provided in an upper rear end part of the central breather chamber 117 to the second connection passage 122 provided in an upper front end part of the central breather chamber 117 to meander as the flow path extends downward.

With reference to the central breather chamber 117, the inlet passage 112, the upstream breather chamber 116, and the first connection passage 121 function as a blow-by gas inlet passage communicating the crank chamber 4 with the central breather chamber 117. In addition, the second connection passage 122 and the downstream breather chamber 118 function as a blow-by gas return passage which forms a part of a passage communicating the central breather chamber 117 with the intake device 90.

As shown in FIGS. 3, 6 and 8, the front side surface of the cylinder block 3 is formed with a front recess 137 which is recessed toward the cylinder 2. The front recess 137 is closed by a front cover 138 fastened to the cylinder block 3 to define a downstream breather chamber 118 jointly with the front cover 138. The downstream end of the second connection passage 122 opens at an upper right part of the bottom surface of the front recess 137. The second connection passage 122 extends in the fore and aft direction above the front female screw hole 61, and communicates an upper part of the front end of the central breather chamber 117 with an upper part of the downstream breather chamber 118. The second connection passage 122 extends linearly, and has an increased width in a part thereof extending from the central breather chamber 117 to the downstream breather chamber 118. A one-way valve 141 is provided at the open end of the second connection passage 122 in the front recess 137. The one-way valve 141 consists of a reed valve, and allows the flow from the second connection passage 122 to the downstream breather chamber 118, while blocking the flow from the downstream breather chamber 118 to the second connection passage 122.

A through hole 142 is formed on an upper left side part of the front cover 138, and one end of the connection pipe 114 is inserted therein. The connection pipe 114 may be, for example, a flexible hose. The end of the connection pipe 114 is in contact with an abutment wall 143 protruding from the bottom surface of the front recess 137 so that the insertion depth is fixed. Further, the outer periphery of the connection pipe 114 and the edge of the through hole 142 are in closed contact with each other in an airtight manner. The thickness of the abutment wall 143 is selected to be smaller than the inner diameter of the connection pipe 114 so the interior of the connection pipe 114 and the downstream breather chamber 118 communicate with each other. The other end of the connection pipe 114 communicates with the inside of the air cleaner 91.

As shown in FIG. 8, a plurality of baffle walls 144 protrude from the bottom surface of the front recess 137 toward the front cover 138. At least one of the baffle walls 144 is disposed between the downstream end of the second connection passage 122 and the upstream end of the connection pipe 114, and extends vertically. The baffle walls 144 cause the flow path from the second connection passage 122 provided in the upper right part of the downstream breather chamber 118 to the connection pipe 114 provided in the upper left part of the downstream breather chamber 118 to meander as the flow path extends downward.

As shown in FIG. 3, the lower end of the front recess 137 communicates with the upper end of the front bolt hole 59 of the support body 51 via a connection passage 146. The connection passage 146 is formed at least in the cylinder block 3, opens at the block-side fastening surface 52, and communicates with the bolt hole 59. Further, the connection passage 146 may be formed in the support body 51 in addition to the cylinder block 3. Further, the connection passage 146 may communicate with the front female screw hole 61. The support body 51 is formed with an oil return port 147 that opens from a lower part of the front bolt hole 59 to the side surface (left side surface) of the support body 51 on the side of the cylinder 2. The oil return port 147 is provided in a lower part of the support body 51, and in particular in a lower end part of the support body 51 or an adjacent part thereto. The lower part of the support body 51 refers to a part located below the center of the bearing hole, and the lower end part of the support body 51 refers to a part located below the lower end of the bearing hole 63. The outer diameter of the bolt 62 is smaller than the inner diameter of the bolt hole 59. so that a space through which oil can flow is defined between the inner circumferential surface of the bolt hole 59 and the outer circumferential surface of the bolt 62. Further, in order to enlarge the flow path, a groove extending in the longitudinal direction (vertical direction) may be formed on one of the inner circumferential surface of the bolt hole 59 and the outer circumferential surface of the bolt 62. The connection passage 146, the space between the inner peripheral surface of the bolt hole 59 and the outer peripheral surface of the bolt 62, and the oil return port 147 communicate with one another so as to define a first oil return passage 150 that returns the oil collected at the bottom of the downstream breather chamber 118 to the crank chamber 4.

The cylinder block 3 is formed with a second oil return passage 151 which communicates the lower end of the central breather chamber 117 with the crank chamber 4. The second oil return passage 151 may be formed as a small through hole. In another embodiment, the second oil return passage 151 communicates the lower end of the central breather chamber 117 with the front bolt hole 59. In this case, the space between the inner circumferential surface of the bolt hole 59 and the outer circumferential surface of the bolt 62 serves both as the first oil return passage 150 and the second oil return passage 151.

The mode of operation of the internal combustion engine 1 configured as described above is discussed in the following. As shown by the white arrows in FIG. 3, the blow-by gas flows from the gas inlet 111 to the inlet passage 112, the upstream breather chamber 116, the first connection passage 121, the central breather chamber 117, the second connection passage 122, the downstream breather chamber 118, and the connection pipe 114, in that order, before flowing into the air cleaner 91 of the intake device 90. The blow-by gas is mixed with fresh air in the air cleaner 91, and is supplied to the cylinder 2 via the carburetor 92 and the intake port 33. The blow-by gas collides with the baffle walls 133, 135, 144 in the upstream breather chamber 116, the central breather chamber 117, and the downstream breather chamber 118 so that oil is separated from the blow-by gas. The oil collected in the upstream breather chamber 116 flows downward by gravity, passes through the inlet passage 112 and the gas inlet 111, and returns to the crank chamber 4. As shown by the black arrows in FIG. 3, the oil collected in the central breather chamber 117 flows downward by gravity, passes through the second oil return passage 151, and returns to the crank chamber 4. The oil collected in the downstream breather chamber 118 flows downward by gravity, passes through the first oil return passage 150, and returns to the crank chamber 4.

The effect of the internal combustion engine 1 configured as described above is discussed in the following. Since the bearing member 50 that supports the crankshaft 12 is disposed in a region surrounding the lower end of the cylinder 2, the bearing member 50 is positioned substantially at the center of the crank chamber 4. Therefore, by forming the oil return port 147 in the support body 51 of the bearing member 50, the oil return port 147 can be disposed substantially at the center of the crank chamber 4, and is therefore located above the surface 100 of the oil stored in the lower part of the crank chamber 4. The bearing member 50 and the oil return port 147 are positioned above the oil surface 100 without regard to the orientation of the internal combustion engine 1, or even when any one of the front side, the rear side, the left end face, and the right end face of the internal combustion engine 1 is facing down. In particular, since the oil return port 147 is formed on the left side surface (the side surface on the side of the cylinder 2) of the support body 51, even when the right end surface of the internal combustion engine 1 is facing down, an adequate distance can be secured between the oil surface 100 and the oil return port 147. Thereby, the oil is prevented from flowing backward from the oil return port 147.

The bearing member 50 that supports the crankshaft 12 is an essential component of the internal combustion engine 1. Therefore, by forming the first oil return passage 150 in the bearing member 50, an increase in the number of component parts and an increase in the size of the internal combustion engine 1 can be avoided.

Since the bolt hole 59 also serves as a part of the first oil return passage 150, an additional passage is not required to be formed in the support body 51. Therefore, the support body 51 can be made compact. Further, by using the female screw hole 61 as a part of the first oil return passage 150, the length of the connection passage 146 can be minimized.

In addition, by using the bearing member 50, the central breather chamber 117 can be formed without increasing the number of component parts. Since the central recess 134 has an open end facing downward when not closed by the bearing member 50, necessary processing such as deburring can be performed during the process of forming the engine block 30.

Since a part of the cylinder block 3 located between the female screw holes 61 is effectively utilized as a part of the central breather chamber 117, an increase in the size of the cylinder block 3 can be avoided. Further, by extending the central breather chamber 117 along the bearing member 50, the central breather chamber 117 can be expanded. By arranging the second connection passage 122 above the female screw holes 61, the thickness of the wall of the cylinder block 3 can be minimized.

By providing the central breather chamber 117 centrally of the cylinder block 3 with respect the fore and aft direction, the lengths of the first connection passage 121 and the second connection passage 122 communicating the upstream breather chamber 116 and the downstream breather chamber 118 with each other in the fore and aft direction can be minimized. Thereby, when forming the engine block 30, the necessary stroke or travel of the mold in forming the first connection passage 121 and the second connection passage 122 can be minimized. Thereby, the molding device or the casting device of the engine block 30 can be downsized.

The present invention has been described in terms of a specific embodiment, but is not limited by such an embodiment, and can be modified in various ways without departing from the scope of the present invention. The toothed belt 85 and the pulleys 76 and 82 of the power transmission mechanism 15 may be replaced by a chain and sprockets. In this case, the transmission mechanism will be a chain case, instead of a belt case.

Glossary of Terms

| | |
|---|---|
| 1: internal combustion engine | 2: cylinder |
| 4: crank chamber | 12: crankshaft |
| 19: second case half (case member) | 30: engine block |
| 50: bearing member | 51: support body |
| 52: block-side fastening surface | 53: bearing-side fastening surface |
| 56: first pin hole | 57: second pin hole |
| 58: positioning pin | 59: bolt hole |
| 61: female screw hole | 62: bolt |
| 63: bearing hole | 65: second bearing |
| 66: retaining ring | 67: locking piece |
| 90: intake device | 100: oil surface |
| 110: blow-by gas passage | 111: gas inlet |
| 112: inlet passage | 113: breather chamber |
| 114: connection pipe | 116: upstream breather chamber |
| 117: central breather chamber | 118: downstream breather chamber |
| 121: first connection passage | 122: second connection passage |
| 131: rear recess | 132: rear cover |
| 134: central recess | 135: baffle wall |
| 137: front recess | 138: front cover |
| 146: connection passage | 147: oil return port |
| 150: first oil return passage | 151: second oil return passage |

The invention claimed is:

1. An internal combustion engine, comprising:
an engine block defining a cylinder;
a case member fastened to a lower part of the engine block to define a crank chamber jointly with the engine block; and
a bearing member fastened to the engine block in the crank chamber to rotatably support a crankshaft;
wherein the engine block is provided with a central recess formed in a part thereof to which the bearing member is fastened, a blow-by gas inlet passage communicating the central recess with the crank chamber, and a blow-by gas return passage forming a part of a passage communicating the central recess with an intake device, the central recess and the bearing member jointly defining a central breather chamber,
the bearing member extends orthogonally to an axis of the crankshaft as viewed in a direction extending along an axis of the cylinder, and is provided with a pair of bolt holes through which bolts for fastening the bearing member to the engine block pass in either end part thereof, and
the engine block is provided with a pair of female screw holes into which the respective bolts are threaded in parts thereof opposing the respective bolt holes, the central recess being positioned between the female screw holes.

2. The internal combustion engine as defined in claim 1, wherein the central recess extends along the bearing member.

3. The internal combustion engine as defined in claim 1, wherein the central recess is formed deeper than the female screw holes, and at least one of the blow-by gas inlet passage and the blow-by gas return passage extends above one of the female screw holes.

4. The internal combustion engine as defined in claim 1, wherein at least one baffle wall projects into the central recess.

5. The internal combustion engine as defined in claim 1, wherein at least one of the engine block and the bearing member is provided with an oil return passage communicating the central breather chamber with the crank chamber.

6. The internal combustion engine as defined in claim 1, wherein as viewed in a direction extending along an axis of the crankshaft, the blow-by gas inlet passage is located on one side of the cylinder, and the blow-by gas return passage is located on another side of the cylinder,
the blow-by gas inlet passage includes an upstream breather chamber, and a first connection passage extending linearly from the upstream breather chamber to the central breather chamber, and
the blow-by gas return passage includes a downstream breather chamber, and a second connection passage extending linearly from the downstream breather chamber to the central breather chamber.

7. The internal combustion engine as defined in claim 6, wherein the upstream breather chamber is formed by a first recess formed on one side surface of the engine block and a first cover closing the first recess, and the downstream breather chamber is formed by a second recess formed on another side surface of the engine block and a second cover closing the second recess, and
wherein an end of the first connection passage opens at a bottom portion of the first recess, and an end of the second connection passage opens at a bottom portion of the second recess.

8. The internal combustion engine as defined in claim 1, wherein a transmission mechanism case accommodating a transmission mechanism therein is provided on a side part of the cylinder block, and the central recess is formed in a part forming both a part of both the cylinder block and a part of the transmission mechanism case.

* * * * *